US006410994B1

(12) United States Patent
Jones et al.

(10) Patent No.: US 6,410,994 B1
(45) Date of Patent: Jun. 25, 2002

(54) MODULAR POWER STRIP

(75) Inventors: Christopher Jones, Oak Lawn; Howard Danzyger, Aurora, both of IL (US); James Weisburn, Massillon, OH (US); James W. Beile, Arlington Heights, IL (US); Karenann Brow, Elgin, IL (US); James F. Caruso, Evanston, IL (US)

(73) Assignee: Fellowes Manufacturing Company, Itasca, IL (US)

( * ) Notice: Subject to any disclaimer, the term of this patent is extended or adjusted under 35 U.S.C. 154(b) by 0 days.

(21) Appl. No.: 09/310,062

(22) Filed: May 11, 1999

(51) Int. Cl.[7] .................................................. H02J 1/00

(52) U.S. Cl. ............................ 307/36; 307/11; 307/42; 439/369; 439/501; 439/717

(58) Field of Search ................................ 439/367–369, 439/460, 501, 731, 715, 717, 723, 724; 307/36, 11, 42, 29, 147, 18, 155, 38, 156

(56) References Cited

U.S. PATENT DOCUMENTS 2,231,001 A 2/1941 Engstrom
2,351,379 A 6/1944 Wehringer
2,502,658 A 4/1950 Lindmark
2,536,776 A 1/1951 Smellie
2,561,556 A 7/1951 Bell
2,574,992 A 11/1951 Webster
3,042,337 A 7/1962 Dinneen
3,213,185 A 10/1965 Petrick
3,289,260 A 12/1966 Buscall, Jr.
3,290,453 A 12/1966 Jensen
3,646,684 A 3/1972 Paulsen
4,095,871 A 6/1978 Holte
4,123,012 A 10/1978 Hough
4,177,961 A 12/1979 Gruenewald
4,395,640 A * 7/1983 Bone .......................... 307/115
D270,629 S 9/1983 Drew
4,500,150 A 2/1985 Leibensperger et al.
4,520,239 A 5/1985 Schwartz
D285,065 S 8/1986 Bobrovniczky
D285,435 S 9/1986 Hoehne
4,687,154 A 8/1987 Deweese
4,717,350 A 1/1988 Lax
D294,487 S 3/1988 Bannigan
4,778,125 A 10/1988 Hu
4,867,701 A 9/1989 Wiand
5,071,367 A 12/1991 Luu
D327,873 S 7/1992 Luu
5,157,273 A * 10/1992 Medendorp et al. ........ 307/147
5,234,360 A * 8/1993 Kramer, Jr. ................. 439/505
5,236,371 A * 8/1993 Matthis ...................... 439/501
5,236,374 A * 8/1993 Leonard et al. ............. 439/505
D342,055 S 12/1993 Wakefield
5,292,257 A 3/1994 Milan
D349,885 S 8/1994 Lee et al.
5,334,033 A 8/1994 Milan
D350,916 S 9/1994 Rossman et al.
D350,917 S 9/1994 Rossman et al.
D350,939 S 9/1994 Rossman et al.
D350,940 S 9/1994 Rossman et al.
D352,273 S 11/1994 Fladung
D356,294 S 3/1995 Fladung
5,424,903 A 6/1995 Schreiber
5,430,598 A 7/1995 Rodolfo et al.
5,439,390 A * 8/1995 Raynor et al. .............. 439/502

(List continued on next page.)

*Primary Examiner*—Fritz Fleming
(74) *Attorney, Agent, or Firm*—Brinks Hofer Gilson & Lione

(57) ABSTRACT

A modular power strip having two or more modules with each having at least one electrical outlet. The modules are removably connected to each other to provide one or more remote electrical connections. Each module is electrically connected. An electrical cord connecting the modules can be stored when the modules are connected.

20 Claims, 3 Drawing Sheets

U.S. PATENT DOCUMENTS

| | | | | | |
|---|---|---|---|---|---|
| D362,229 | S | * | 9/1995 | Moses | D13/142 |
| 5,457,600 | A | | 10/1995 | Campbell et al. | |
| D366,865 | S | | 2/1996 | Stringer | |
| D368,467 | S | | 4/1996 | Parshad | |
| D368,893 | S | | 4/1996 | Harwood et al. | |
| D369,784 | S | | 5/1996 | Pogue et al. | |
| D370,458 | S | | 6/1996 | Fladung et al. | |
| 5,547,393 | A | * | 8/1996 | Jansen | 439/501 |
| 5,562,488 | A | * | 10/1996 | Neiser et al. | 439/501 |
| 5,596,479 | A | | 1/1997 | Campbell et al. | |
| 5,629,826 | A | | 5/1997 | Roca et al. | |
| D381,316 | S | | 7/1997 | Yu | |
| D382,855 | S | | 8/1997 | Salmond et al. | |
| 5,658,158 | A | | 8/1997 | Milan | |
| 5,700,150 | A | | 12/1997 | Morin | |
| 5,700,158 | A | | 12/1997 | Neiser et al. | |
| 5,708,554 | A | | 1/1998 | Liner | |
| 5,721,934 | A | | 2/1998 | Scheurich | |
| 5,738,548 | A | | 4/1998 | Rutulante | |
| 5,748,430 | A | | 5/1998 | Bird | |
| 5,780,775 | A | | 7/1998 | Yu | |
| 5,902,148 | A | * | 5/1999 | O'Rourke | 439/505 |
| 5,931,702 | A | * | 8/1999 | Fladung | 439/652 |
| 5,957,701 | A | * | 9/1999 | McMillin | 439/13 |

* cited by examiner

MODULAR POWER STRIP

BACKGROUND OF THE INVENTION

The present invention relates generally to power strips, and particularly to power strips of a modular nature, whereby electrical power may be provided for various types of electrical devices and/or connections, such as power supply cords, incoming telephone lines, cable TV protection using coaxial connections, local area networks (LAN's), and wide area networks (WAN's).

More particularly, the present invention relates to power strips having multiple modules, and surge protection capability. In modern homes and offices, it is convenient to use a single power strip for multiple electrical appliances or electrical lines. Unfortunately, in the typical office or home, because such appliances and electrical lines are located by necessity or choice at different locations remote from other such appliances or lines, it often becomes necessary to employ more than one power strip in a single room, or use one or more extension cords running from the various appliances to a single power strip. When multiple power strips are used or electrical extension is required, the presence of the additional power strips and/or extension cords often contributes to an unsightly appearance and may result in a safety hazard if not carefully placed so as to avoid pedestrian traffic and the like.

In addition, electrical lines, such as AC power lines, telephone lines, data lines and coaxial cable lines are subject to accidental power surges. These power surges are a condition wherein an abnormally high current and/or voltage is transmitted over the electrical line. Power surges can be caused by lightning or short circuits. The surge can cause permanent damage to devices connected to the electrical line.

Therefore, surge protectors have been developed to detect surges and to block the surge before it reaches devices on the electrical line. Generally, surge protectors are divided into two different types; primary and secondary.

Primary surge protectors are generally located where electrical lines enter a building and are designed with a relatively large "surge capacity" so that they can protect against relatively large surges. Secondary surge protectors, on the other hand, are generally located on the inside of a building. It is common to place a secondary surge protector on an AC power line between a wall outlet and a computer, or other electrical appliance. In addition, primary and secondary surge protectors are further divided into surge protectors for each type of electrical line. The various types of electrical lines have different constructions, different kinds of interfacing hardware and are subject to different types of surges. Furthermore, the various types of electrical lines typically follow different paths within a building. For instance, telephone lines run to telephone jacks, while AC power lines run to power outlets.

BRIEF SUMMARY OF THE INVENTION

It is an object of the present invention to provide a power strip having multiple modules.

It is a further object of the present invention to provide a power strip having multiple modules capable of being placed at different locations to accommodate numerous and various electrical appliances and electrical lines.

It is yet another object of this invention to provide a power strip that has multiple modules wherein the multiple modules are electrically connected (such as by a cord) to accommodate variable distances between remote appliances or electrical lines.

It is also an object of the present invention to provide a modular power strip providing secondary surge protection, and having multiple modules capable of being placed at different locations to accommodate numerous and various electrical appliances and electrical lines.

DETAILED DESCRIPTION OF THE INVENTION

Figure 1:
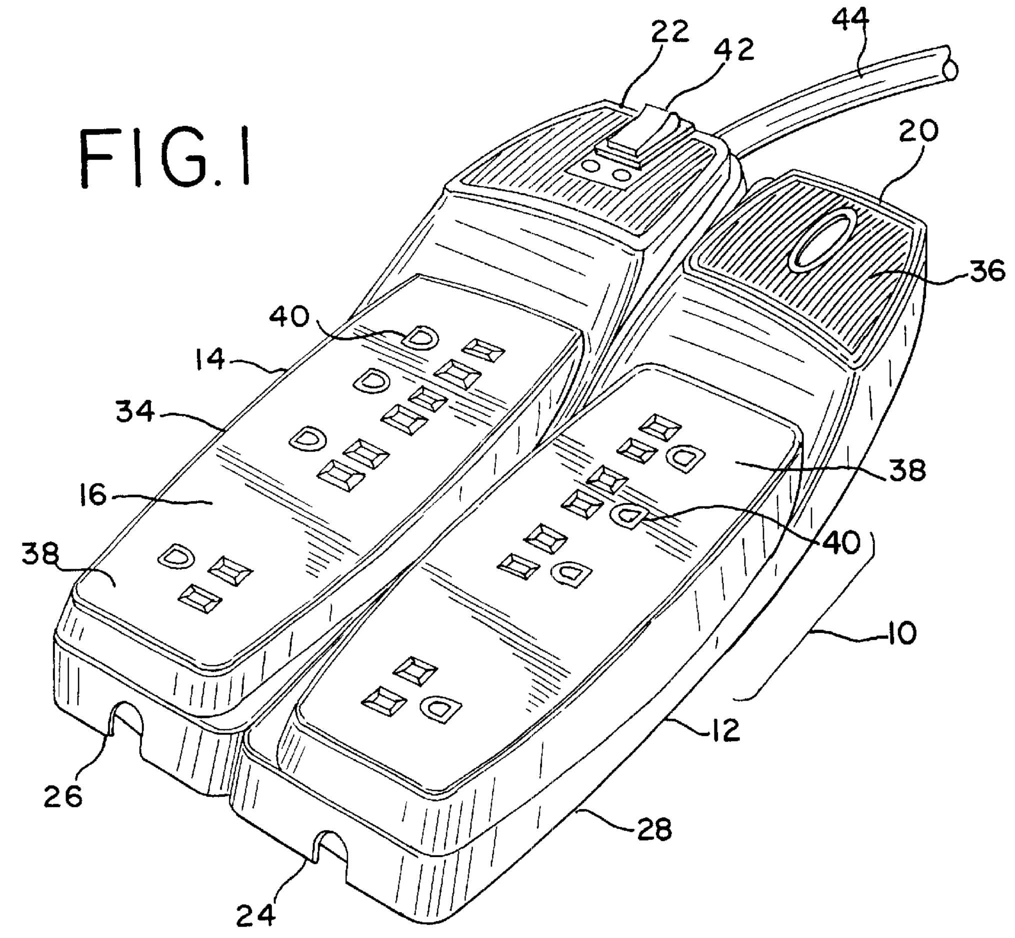
FIG. 1 is a perspective view of the modular power strip with the two modules connected to form an integrated housing.
Figure 6:
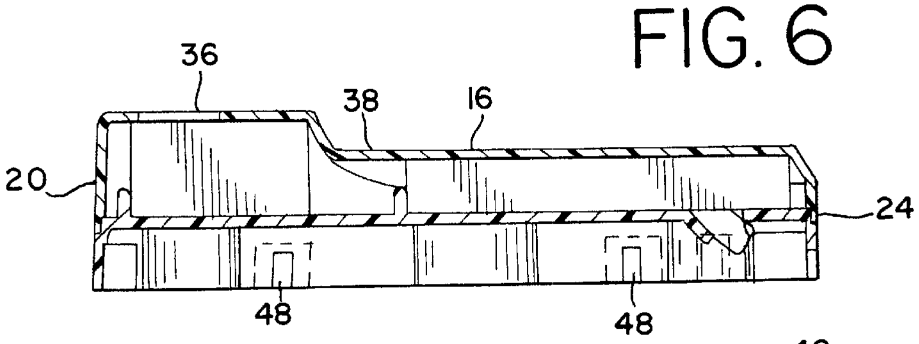
FIG. 6 is a side elevation of one module of the modular power strip.
Figure 7:
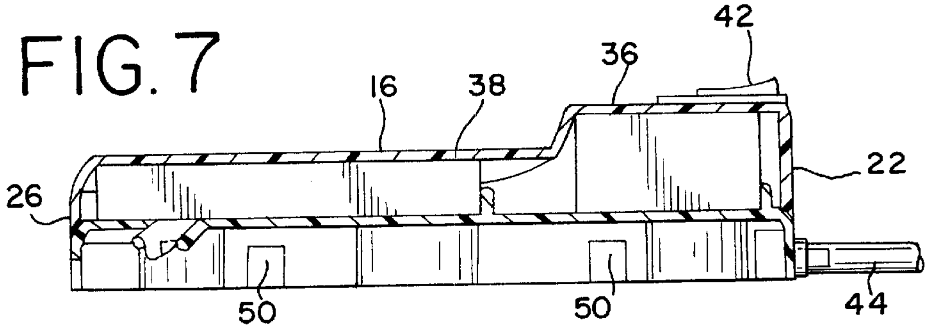
FIG. 7 is a side elevation of another module the modular power strip.
Figure 5:
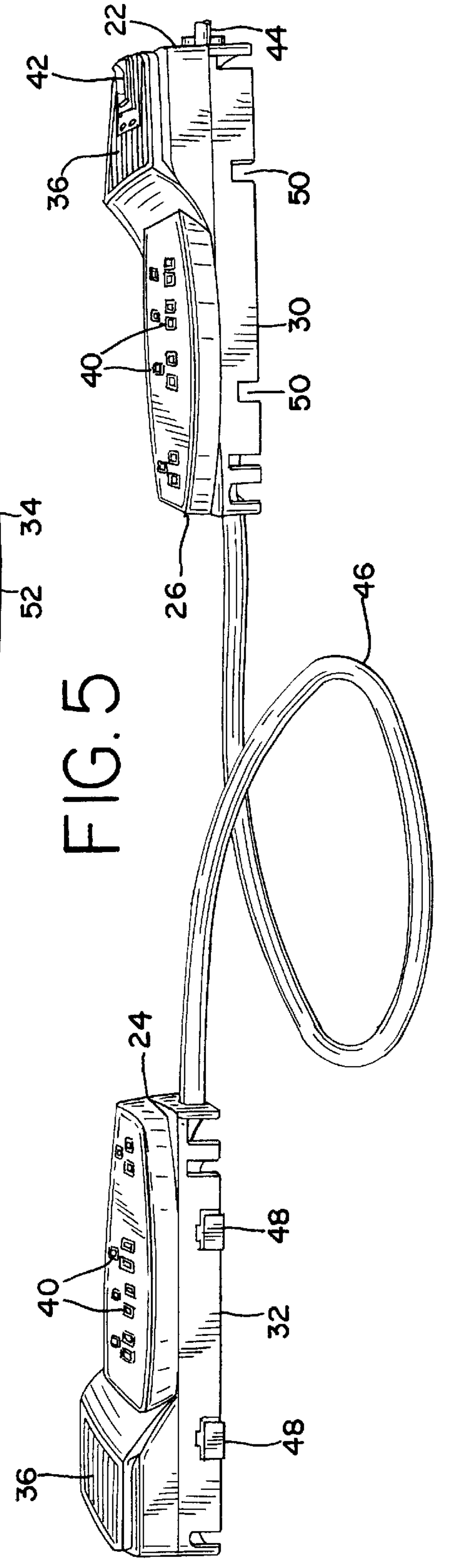
FIG. 5 is a perspective view of the modular power strip with the two modules disconnected from one another.

A modular power strip, generally designated by the numeral 10, in accordance with the present invention is shown in perspective in FIGS. 1 and 5.

The modular power strip 10 as shown in the drawings comprises a first 12 and second 14 power supply module that can be removably and matingly connected to one another. The modules 12 and 14 are generally elongated and are formed of any rigid material such as plastic, metal, ceramic or any combination thereof.

First and second modules 12 and 14 generally comprise an upper surface 16, a generally hollow underside 18, a first end 20 and 22, a second end 24 and 26, and a first elongated side 28 and 30 and a second elongated side 32 and 34, said elongated sides extending parallel to each other and perpendicular to the first ends and second ends of each module. The upper surface 16 of the first 12 and second 14 modules has a generally raised portion 36 at the first ends 20 and 22, and a generally depressed portion 38 extending from said raised portion 36 to the second ends 24 and 26. The depressed portion 38 of the upper surface 16 of modules is shown to include one or more electrical outlets 40. In a preferred embodiment, the upper surface 16 of the raised portion 36 of module 14 is shown to include a switch 42 and an electrical cord 44 extending from the first end 22 of the second module 14 having a plug (not shown) for connection to a power supply, including a wall outlet, an extension cord, generator or power strip. The switch 42 controls the flow of electrical power from the electrical cord 44 to the switched electrical outlets 40 so that power can be switched either on or off.

A second cord 46 extends from the underside of the second end 24 of the first module 12 to the second end 26 of the second module 14 to allow electrical current to flow from the electrical outlet through the first 12 and second 14 modules. If additional modules are desired or needed, a third cord (not shown) may extend from the first end 22 of the second module 14 to connect with the first end of the third module to provide electrical current to the third module (not shown). Additional modules and cords may be connected as needed or desired in accordance with the description set forth herein. The length of the second cord 46 or any additional cords (not shown) needed or desired is limited only by consumer preference.

In another embodiment, one of the modules is equipped with a wallmounting apparatus (not shown) allowing the module to be mounted on a wall and directly plugged into a wall outlet, thereby eliminating the need for a first cord for such electrical connection.

In a preferred embodiment, the modular power strip 10 of the present invention comprises two separate modules 12 and 14 connected by a cord 46 preferably four feet in length. It is to be understood, however, that the length of the cord may be any suitable length. When surge protection is required at locations remote from one another, the modules 12 and 14 can be disconnected and separated from one another and placed at remote locations as necessary or desired. The distance from which one module can be placed from the other module is limited only by the length of the cord extending between two or more modules.

When a power strip is needed at a single location, the modules 12 and 14 of the present invention can be matingly and removably connected to form a single unit. Preferably, each module is connected along one or more of their elongated sides. For example, in a preferred embodiment, the second elongated side 32 of the first module 12 has at least one tab 48 protruding outwardly from the second elongated side 32 of the first module 12 that engages one or more apertures 50 in the first elongated side 30 of the second module 14. As shown in FIG. 1, when connected by the connecting means, the first and second modules 12 and 14 form a single unit that may be used as a single power strip at a single location. Similarly, an additional module may be connected to the second elongated 34 side of the second module 14 and so forth.

Figure 2:
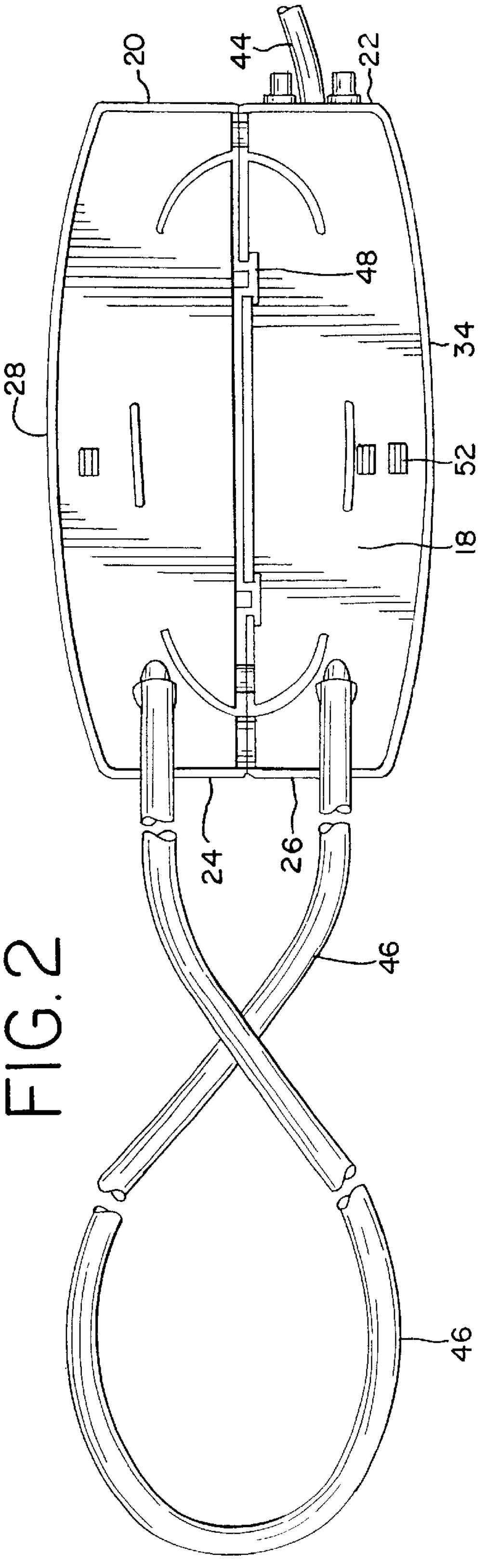
FIG. 2 is a view of the underside of the power strip with the electrical cord placed outside of the housing.
Figure 3:
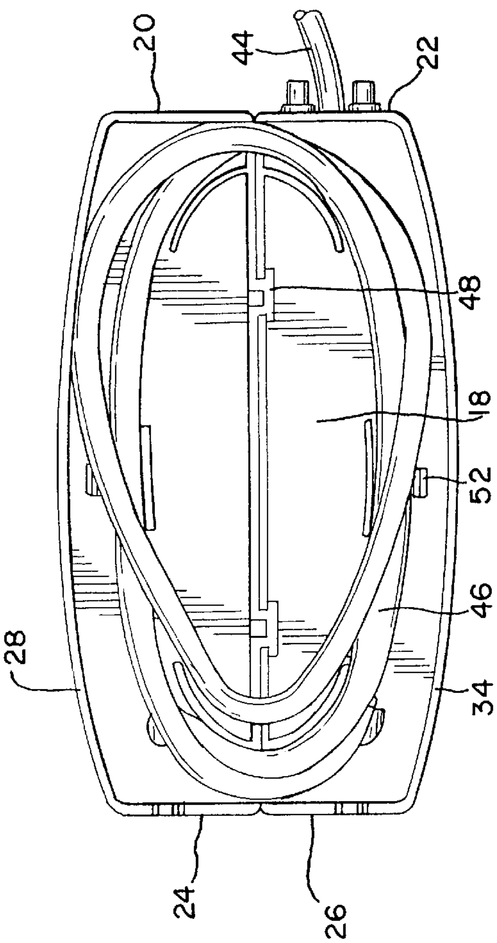
FIG. 3 is a view of the underside of the power strip with the electrical cord placed inside of the housing.
Figure 4:
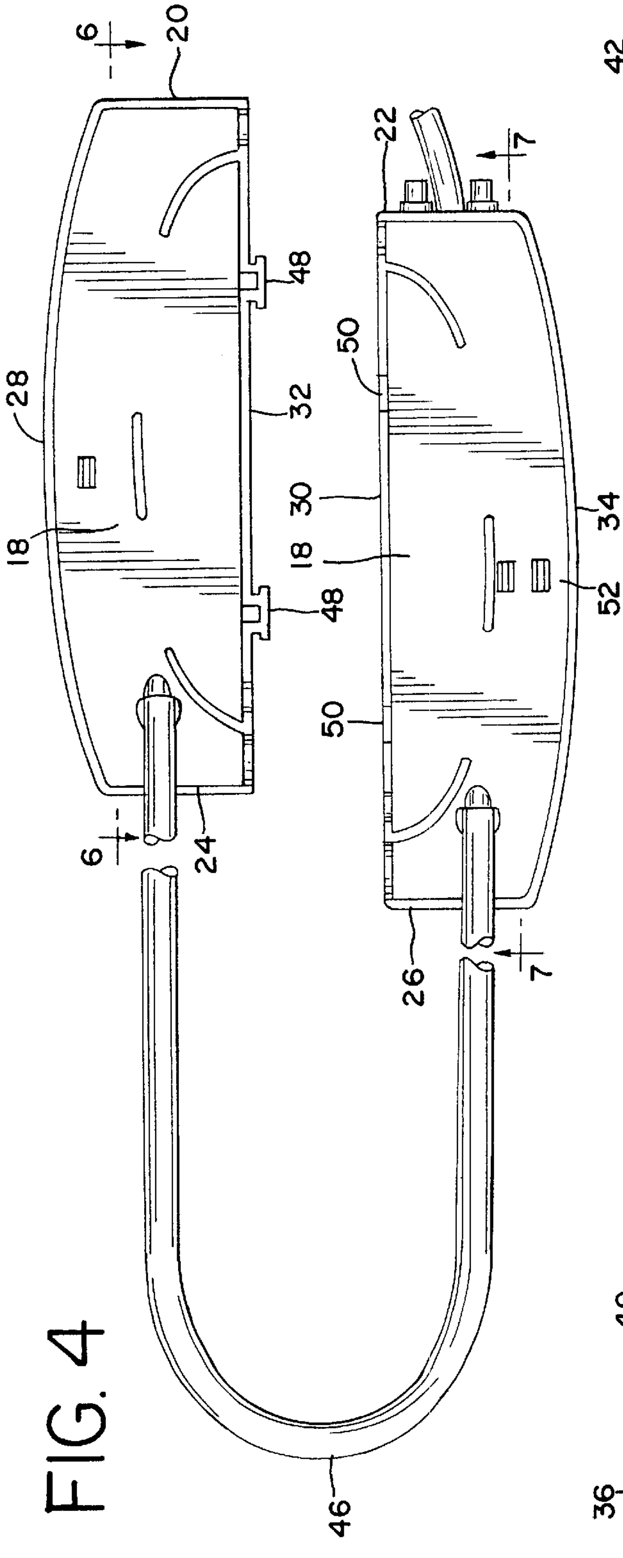
FIG. 4 is a view of the underside of the power strip with the two modules disconnected from one another.

As shown in FIGS. 2 and 3, when modules 12 and 14 are united to form a single unit, the second cord 46 can be stored in the hollow underside 18 of the connected modules 12 and 14. In a preferred embodiment, as shown in FIG.3, the second cord 46 may coiled by forming one or more loops 54 and retained in the generally hollow underside 18 of the connected modules by clips, clamps, straps, or any combination thereof. In the preferred embodiment as shown in FIGS. 2 and 3, the second cord 46 is crossed upon itself one or more times to form a loop and the looped second cord is fitted into the generally hollow underside 18 of the united housing and held in place by one or more clamps 52.

It will be appreciated that although the invention has been described in detail with reference to the illustrated preferred embodiments, variations and modifications exist with the scope and spirit of the invention as defined in the following claims.

What is claimed is:

1. A modular power strip comprising:

a. a first unit having at least one connecting member, and at least one electrical outlet, the first unit being electrically connected to a plug adapted to be received in an electrical socket; and b. a second unit electrically connected to the first unit, having at least one electrical outlet and at least one connecting member, wherein the second unit is removably attached to the first unit by cooperation of the at least one connecting member of the first unit and the at least one connecting member of the second unit.

2. The power strip of claim 1 wherein the first unit is electrically connected to the plug by an electrical cord.

3. The power strip of claim 1 wherein the second unit is electrically connected to the first unit by an electrical cord.

4. The modular power strip of claim 3, wherein the first unit and the second unit comprise a generally hollow underside in which the electrical cord may be stored.

5. The modular power strip of claim 4, wherein the generally hollow underside comprises at least one clip for holding the electrical cord in place.

6. The modular power strip of claim 1, wherein the at least one connecting member of the first unit comprises a tab, and wherein the at least one connecting member of the second unit comprises an aperture.

7. A modular power strip comprising two or more modular units electrically connected by a first electrical cord, each modular unit having an upper surface including a plurality of electrical outlets for distributing electrical power therefrom; first and second ends; and first and second elongated sides, wherein each of the modular units has a connecting member, wherein the connecting member on one of the modular units cooperates with the connecting member on another of the modular units to removably attach the units.

8. The modular power strip of claim 7, wherein the two or more modular units further comprise a generally hollow underside in which the first electrical cord may be stored.

9. The modular power strip of claim 7, wherein one of the modular units comprises a second electrical cord including a plug for insertion into an outlet.

10. A power strip comprising, a. a first unit having at least one connecting member, and at least one electrical outlet, the first unit being electrically connected to a plug adapted to be received in an electrical socket; and b. a second unit electrically connected to the first unit, having at least one electrical outlet and at least one connecting member, wherein the second unit is removably attached to the first unit by cooperation of the at least one connecting member of the first unit and the at least one connecting member of the second unit; and c. a surge protector electrically coupled to the plug.

11. The power strip of claim 10 wherein the first unit is electrically connected to the plug by an electrical cord.

12. The power strip of claim 10 wherein the second unit is electrically connected to the first unit by an electrical cord.

13. The power strip of claim 12, wherein the first unit and the second unit comprise a generally hollow underside in which the electrical cord may be stored.

14. The power strip of claim 13, wherein the generally hollow underside comprises at least one clip for holding the electrical cord in place.

15. The power strip of claim 10, wherein the at least one connecting member of the first unit comprises a tab, and wherein the at least one connecting member of the second unit comprises an aperture.

16. A power strip comprising two or more modular units electrically connected by a first electrical cord, each modular unit having an upper surface including a plurality of electrical outlets for distributing electrical power therefrom; first and second ends; and first and second elongated sides, wherein each of the modular units has a connecting member, wherein the connecting member on one of the modular units cooperates with the connecting member on another of the modular units to removably attach the units, and a surge protector electrically coupled to the first electrical cord.

17. The modular power strip of claim 16 wherein the two or more modular units further comprise a generally hollow underside in which the first electrical cord may be stored.

18. The power strip of claim 17, wherein the generally hollow underside comprises at least one clip for holding the first electrical cord in place.

19. The power strip of claim 16, wherein one of the modular units comprises a second electrical cord including a plug for insertion into an outlet.

20. A modular power strip comprising:

a. a first unit having at least one electrical outlet and walls which define a first cavity, the first unit being electrically connected to a plug adapted to be received in an electrical socket;

b. a second unit having at least one electrical outlet and walls which define a second cavity, the second unit being electrically connected to the first unit by a cord, wherein the cord may be stored within the first cavity and the second cavity.

* * * * *